US011879055B2

(12) United States Patent
Yan et al.

(10) Patent No.: US 11,879,055 B2
(45) Date of Patent: Jan. 23, 2024

(54) NON-ACTIVE SULFUR CONTAINING FUNCTIONAL SILANES FOR SILICA COMPOUNDS

(71) Applicant: The Goodyear Tire & Rubber Company, Akron, OH (US)

(72) Inventors: Yuan-Yong Yan, Copley, OH (US); Justin Yinket Che, Wadsworth, OH (US); Thomas Franklin Spilker, Broadview Heights, OH (US); Aaron Patrick Murray, Chardon, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 210 days.

(21) Appl. No.: 17/644,102

(22) Filed: Dec. 14, 2021

(65) Prior Publication Data
US 2023/0183458 A1 Jun. 15, 2023

(51) Int. Cl.
*C08K 5/5419* (2006.01)
*B60C 1/00* (2006.01)
*C08L 15/00* (2006.01)
C08C 19/25 (2006.01)
C08K 3/36 (2006.01)

(52) U.S. Cl.
CPC ............ *C08L 15/00* (2013.01); *B60C 1/0016* (2013.01); *C08K 5/5419* (2013.01); *C08C 19/25* (2013.01); *C08K 3/36* (2013.01)

(58) Field of Classification Search
CPC .......... C08L 15/00; B60C 1/00; C08K 5/5419
USPC ....................................................... 523/155
See application file for complete search history.

(56) References Cited

U.S. PATENT DOCUMENTS

| 3,768,537 | A | 10/1973 | Creasey et al. |
| 5,064,901 | A | 11/1991 | Machado |
| 5,395,891 | A | 3/1995 | Obrecht et al. |
| 5,504,135 | A | 4/1996 | Ardrizzi et al. |
| 5,672,639 | A | 9/1997 | Corvasce et al. |
| 6,013,718 | A | 1/2000 | Cabioch et al. |
| 6,103,808 | A | 8/2000 | Hashimoto |
| 6,127,488 | A | 10/2000 | Obrecht et al. |
| 6,133,364 | A | 10/2000 | Obrecht et al. |
| 6,146,520 | A | 11/2000 | Gupte et al. |
| 6,207,757 | B1 | 3/2001 | Obrecht et al. |
| 6,242,534 | B1 | 6/2001 | Obrecht et al. |
| 6,248,929 | B1 | 6/2001 | Kaimai et al. |
| 6,372,857 | B1 | 4/2002 | Obrecht et al. |
| 6,399,697 | B1 | 6/2002 | Takasaki et al. |
| 6,410,816 | B2 | 6/2002 | Takasaki et al. |
| 6,608,145 | B1 | 8/2003 | Lin et al. |
| 6,936,669 | B2 | 8/2005 | Halasa et al. |
| 7,968,636 | B2 | 6/2011 | York et al. |
| 7,981,966 | B2 | 7/2011 | Kobayashi et al. |
| 8,217,103 | B2 | 7/2012 | Thiele et al. |
| 8,569,409 | B2 | 10/2013 | Thiele et al. |
| 2001/0007049 | A1 | 7/2001 | Takasaki et al. |
| 2001/0023307 | A1 | 9/2001 | Kaimai et al. |
| 2002/0000280 | A1 | 1/2002 | Scholl |
| 2002/0045697 | A1 | 4/2002 | Sohnen et al. |
| 2010/0132868 | A1* | 6/2010 | Hergenrother ............ C08L 9/06 524/451 |
| 2012/0252928 | A1* | 10/2012 | Marechal ................ C08C 19/44 525/105 |
| 2018/0371216 | A1 | 12/2018 | Pappas et al. |
| 2019/0055335 | A1 | 2/2019 | Mecking |
| 2020/0123349 | A1 | 4/2020 | Miller |
| 2020/0223258 | A1 | 7/2020 | Murase |

FOREIGN PATENT DOCUMENTS

| EP | 0839891 B1 | 6/2004 | |
| ES | 2122917 | 7/1999 | |
| JP | 2002097369 | 4/2002 | |
| WO | WO-2016048935 A1 * | 3/2016 | ........... B60C 1/0016 |

OTHER PUBLICATIONS

Blanco Ignazio et al, Synthesis and thermal properties of new dumbbell-shaped isobutyl-substituted POSSs linked by aliphatic bridges, Synthesis and thermal properties of new dumbbell-shaped isobutyl-substituted POSSs linked by aliphatic bridges, Apr. 1, 2014 (Apr. 1, 2014), 5-13, vol. 116, No. 1, Journal of Thermal Analysis and Calorimetry.

Buxadera-Palomero Judit et al, Antibacterial Properties of Triethoxysilylpropyl Succinic Anhydride Silane (TESPSA) on Titanium Dental Implants, Polymeric Materials for Dental Applications, Apr. 1, 2020 (Apr. 1, 2020), 773, vol. 12, No. 4, Polymers.

Cao Ying et al, A novel shape memory-assisted and thermo-induced self-healing boron nitride_epoxy composites based onDiels-Alder reaction, Composites & nanocomposites, May 26, 2020 (May 26, 2020), 11325-11338, vol. 55, No. 25, Journal of Material Science.

Kavetskyy Taras et al, Structural and free vol. characterization of sol-gel organic-inorganic hybrids, Structural and free volume characterization of sol-gel organic-inorganic hybrids, Feb. 20, 2021 (Feb. 20, 2021), 50615 (or * p. 3 *), vol. 138, No. 26, Journal of Applied Polymer Science.

Plinio Innocenzx et al, New Synthetic Route to (3-Glycidoxypropyl)trimethoxysilane-Based Hybrid Organic—Inorganic Materials, New Synthetic Route to (3-Glycidoxypropyl)trimethoxysilane-Based Hybrid Organic—Inorganic Materials, Jul. 1, 1999 (Jul. 1, 1999), 1672-1679, vol. 11, No. 7, Chemistry of Materials.

(Continued)

*Primary Examiner* — Deve V Hall
(74) *Attorney, Agent, or Firm* — Mandy B. Willis

(57) ABSTRACT

A sulfur-vulcanizable rubber compound comprises a silane functionalized diene elastomer, a silane coupling agent, and a silica filler. The silane coupling agent excludes an active sulfur moiety. The rubber compound is a reaction product of a siloxyl condensation reaction between the silane functionalized diene elastomer and the non-sulfur containing silane coupling agent. The coupling agent comprises at least one end terminating group reactive with a hydroxyl group contained on the silica filler and a silane moiety contained on a diene-based elastomer.

19 Claims, 5 Drawing Sheets

(56) References Cited

OTHER PUBLICATIONS

Wahab M A et al, Bridged amine-functionalized mesoporous organosilica materials, Bridged amine-functionalized mesoporous organosilica materials, Oct. 1, 2004 (Oct. 1, 2004), 3439-3447, vol. 177, No. 10, Journal of Solid State Chemistry, Orlando, US.
Extended European Search Report for Application No. 22211137.9, dated May 8, 2023.

* cited by examiner

NON-ACTIVE SULFUR CONTAINING FUNCTIONAL SILANES FOR SILICA COMPOUNDS

FIELD OF THE INVENTION

The present invention relates to a non-active sulfur containing mono-, bis-, and multi-functional coupling agent and rubber compound comprising the same. It finds particular application in conjunction with functional polymers and will be described with particular reference thereto. However, it is to be appreciated that the present exemplary embodiments are also amenable to other like applications.

BACKGROUND OF THE INVENTION

Silica is widely employed in tires to promote certain performance advantages. However, it has a hydrophilic surface that makes it difficult to disperse in an elastomer. One way to improve dispersion in a mixture is to treat silica with an organosilane coupling agent. For decades, sulfur-containing silane coupling agents have been used to link the silica and polymer in vulcanizable silica-filled rubber stocks. Typically, the coupling agent is bifunctional. It has a moiety (e.g., a silyl group) reactive with the silica surface and another moiety (typically, an active sulfur group) that binds to the elastomer. Well-known examples of these types of coupling agents are alkoxysilane polysulfides (e.g., bis(triethyoxysilylpropyl)tetrasulfide (TESPT)) and mercaptosilanes (e.g., S-(octanoyl)mercaptopropyltriethosxysilane (NXT)).

The coupling reactions between silica and these agents can be divided into two schemes: (1) a silanization modification reaction in which the triethoxysilyl group reacts with the silanol groups on the silica; and (2) a silane-polymer coupling reaction in which the sulfur group reacts with the polymer under curing conditions to form the rubber-to-filler bonds. In conventional, functionalized silane coupling agents, the sulfur is believed to be necessary for the cross-linkage to occur.

However, a steep cost is associated with the large quantity of agent (relative to silica content) required for compounding. Another disadvantage of the polysulfide chain is that the silanization must be performed within a limited temperature range to promote a rapid reaction, or else an irreversible thermal degradation of the coupling agent will occur. This will result in, inter alia, scorching of the mixture.

For these among other reasons, additional techniques are desired for incorporating silica fillers into the polymer compositions.

SUMMARY OF THE INVENTION

One embodiment of the disclosure is directed to a sulfur-vulcanizable rubber compound comprising: at least one diene elastomer; a reinforcing filler comprising silica; and a silane coupling agent. In the contemplated embodiment, the diene elastomer is a silane functionalized elastomer. In a preferred embodiment, the silane coupling agent excludes an active sulfur moiety.

Another embodiment of the disclosure is directed to a silica-containing rubber compound for incorporation in a tire. The rubber compound comprises a polymer that is a reaction product of a siloxyl condensation reaction between a silane functionalized diene elastomer and a non-sulfur containing silane coupling agent.

A further embodiment of the disclosure is directed to a non-active sulfur containing bifunctional silane coupling agent. The coupling agent comprises at least one end terminating group reactive with a hydroxyl group contained on precipitated silica and a silane moiety contained on a diene-based elastomer.

BRIEF DESCRIPTION OF THE DRAWINGS

The invention will be described by way of example and with reference to the accompanying drawings in which.

DETAILED DESCRIPTION OF THE INVENTION

The preset invention relates to a silane coupling agent that excludes an active sulfur moiety. It is discovered that a non-sulfur containing functional silane coupling agent can be used to link a silica reinforcement filler (hereinafter "silica" and/or "silica filler") through a functionalized polymer or rubber through the silane and functional linkage.

As used herein, the terms "rubber", "polymer" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

As used herein, except where context requires otherwise, the term "comprise" and variations of the term, such as "comprising", "comprises" and "comprised", are not intended to exclude further additives, components, integers, or steps.

A sulfur-vulcanizable rubber compound comprises a silane functionalized diene elastomer, a silane coupling agent, and a silica filler. The rubber compound is a reaction product of a siloxyl condensation reaction between the silane functionalized diene elastomer and the non-sulfur containing silane coupling agent. The coupling agent comprises at least one end terminating group reactive with a hydroxyl group contained on the silica filler and a silane moiety contained on a diene-based elastomer.

Figure 1A:
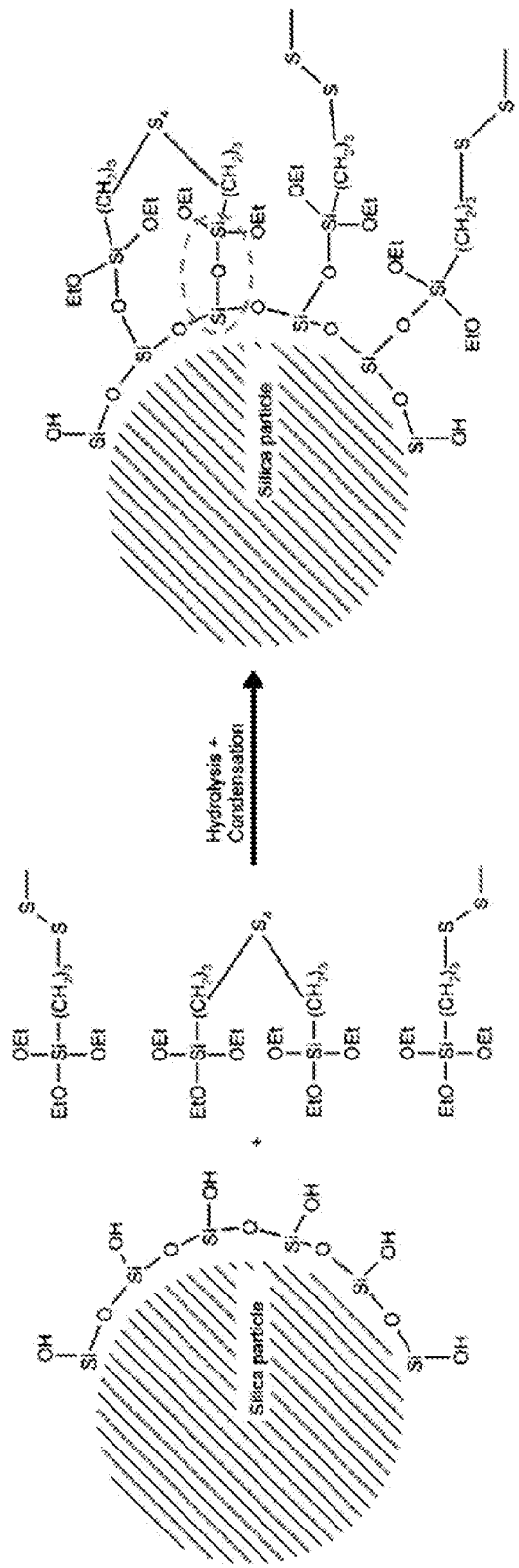
FIG. 1A is a silanization modification reaction in which the triethoxysilyl group reacts with the silanol groups on the silica.
Figure 1B:
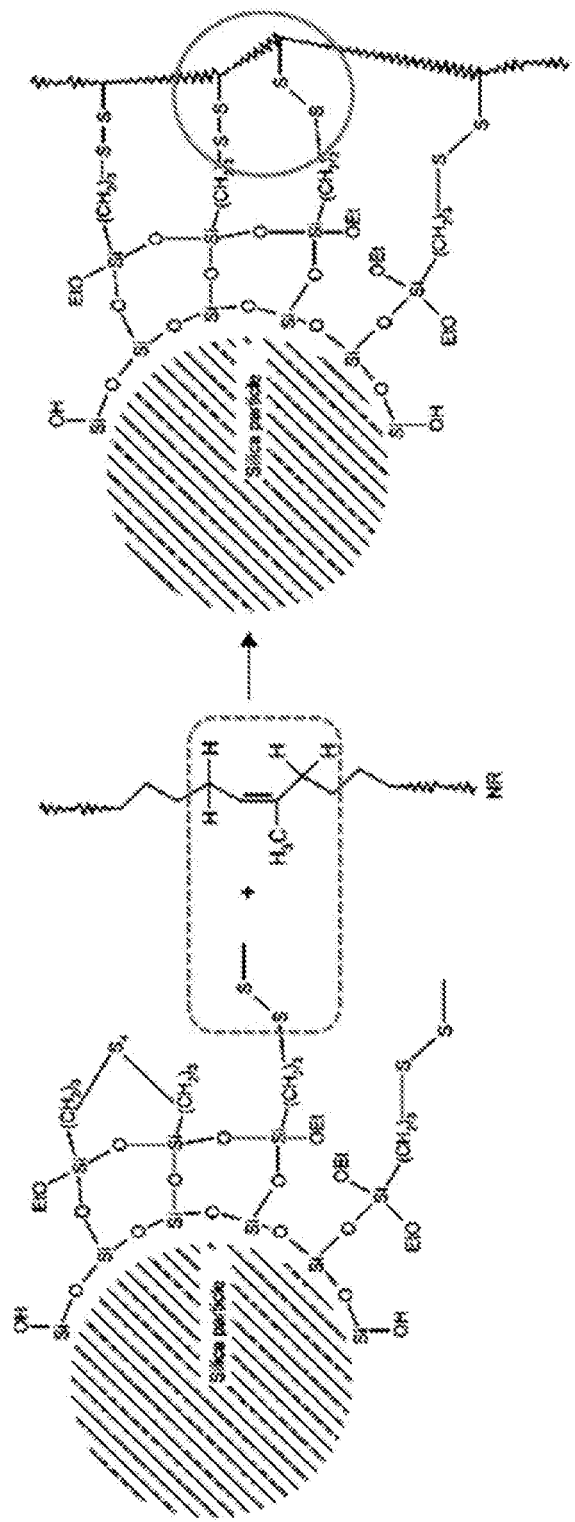
FIG. 1B is a silane-polymer coupling reaction in which the sulfur group reacts with the polymer under curing conditions to form the rubber-to-filler bonds.
Figure 2:
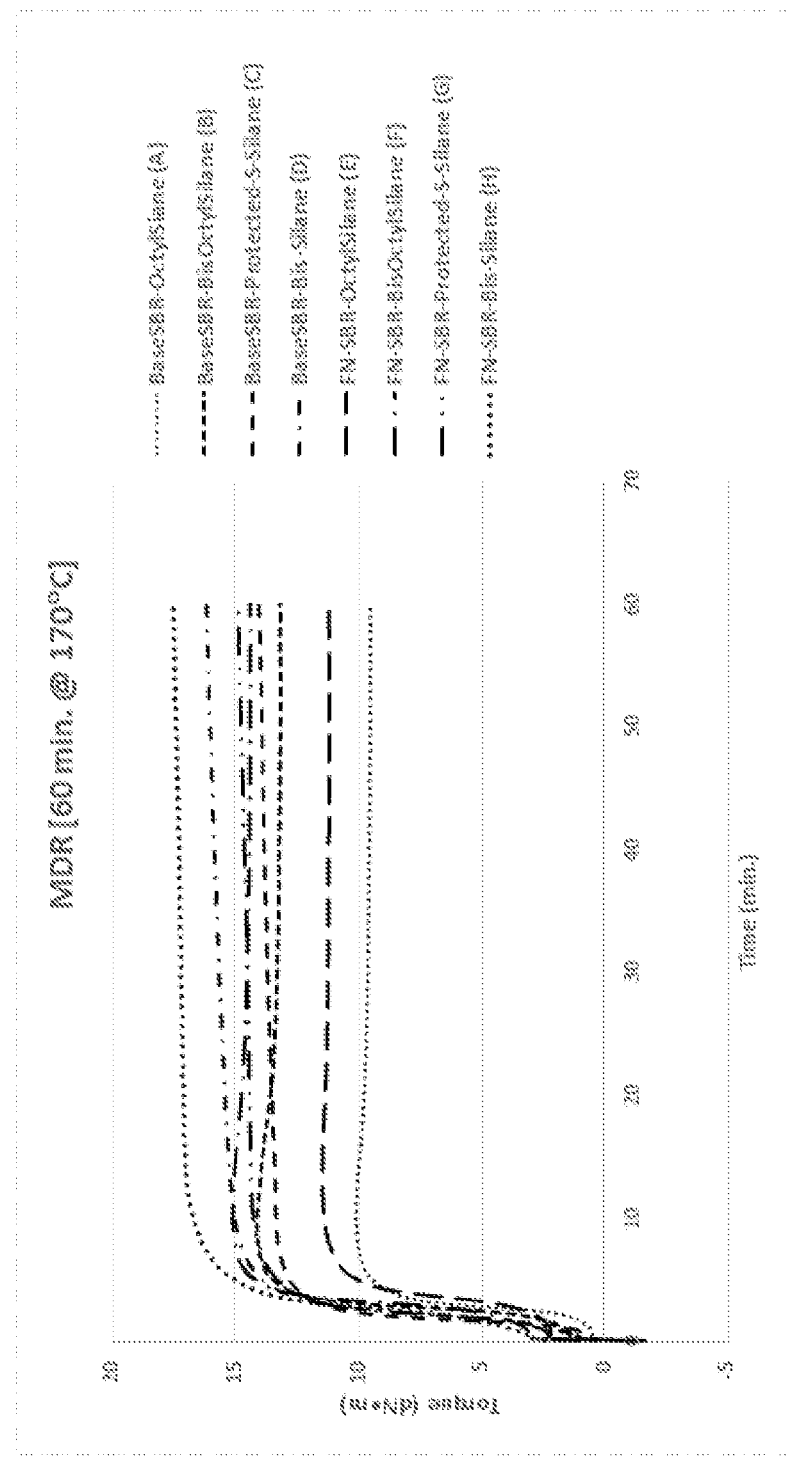
FIG. 2 shows a plot of relative Torque values over Time for the individual Control and Experimental rubber Samples for the second series (Samples A-H) of experiments.

A coupling agent is a material that forms a connection or bond between silica and rubber. Conventional coupling agents are bifunctional compounds represented by the general formulae A-R—B, wherein A is a first functional group capable of bonding to a silica particle. This bond can be between a silicon atom of the coupling agent and an oxygen atom of the silica particle. The process is known as a silanization-modification reaction of the silica surface. FIG. 1A shows silica-silane-salinization in the PRIOR ART using TESPT as an illustrative example. Group B represents a second, different functional group capable of chemically or physically bonding to the rubber polymer. For conventional coupling agents, this bond is between a sulfur atom and the rubber polymer. In conventional coupling agents, group B could include a mercapto group —SH or other groups (e.g., —SCN, —$S_x$ (where x is from 2 to 8)) capable of providing a sulfur that will bond with the rubber polymer. The B group enters into a coupling reaction with the double bonds of the polymer. FIG. 1B shows the silane-polymer coupling reaction following the salinization of FIG. 1A. FIGS. 1A-B display that, for non-functional polymers, the silica-silane-polymer interphase is formed by the sulfur-polymer coupling reaction. This interphase is represented below by structure I.

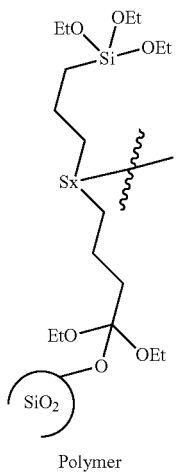

(I)

Polymer

It is discovered that, for a silane functionalized polymer, a silica-silane-polymer interphase can be formed by a siloxyl condensation reaction (—Si—O—Si-Polymer linkage). Such a silica-silane-polymer is represented below by structure II.

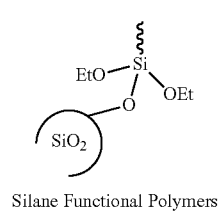

(II)

Silane Functional Polymers

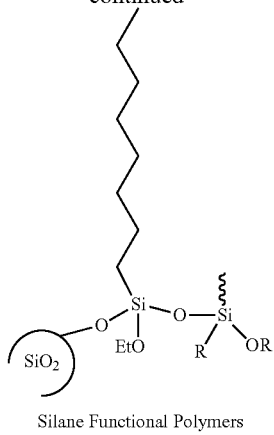

Silane Functional Polymers

Silane Functional Polymers

It is therefore discovered that, a coupling agent that excludes a sulfur moiety or a similar functioning moiety can be employed in rubber compounds formed from functionalized polymers.

A non-active sulfur containing bifunctional silane coupling agent according to the present disclosure, comprises at least one end terminating group reactive with a hydroxyl group contained on precipitated silica and a silane moiety contained on a diene-based elastomer. In the contemplated embodiment, the coupling agent is a mono- and/or bi- and/or multi-functional organosilane having at least two leaving groups on a silicon atom.

In one embodiment the coupling agent is a bifunctional organosilane having the general formulae A-R-A'. The A and A' each independently represent a moiety capable of bonding to both a silica and a diene elastomer. In this manner, each moiety has two leaving groups. In one embodiment, the leaving groups can be the same or different alkoxy, cycloalkoxy, and phenoxy groups. R represents a bifunctional group that is capable of connecting and bonding to A and A' in a stable manner. In some embodiments, R may be a chemical bond directly between A and A', but generally R will be a hydrocarbon chain, a heteroatom-containing (O, N, P) hydrocarbon, or a ring group. The R group is preferably a hydrocarbon having from one to 10 carbon atoms. The hydrocarbon chain, however, could be longer and could be branched.

In some embodiments, the R can contain a non-active sulfur in the hydrocarbon chain. The invention differs from conventional organosilanes to the extent that the sulfur is part of an active moiety, discussed infra.

Non-limiting examples of bifunctional silanes of these formulae are:

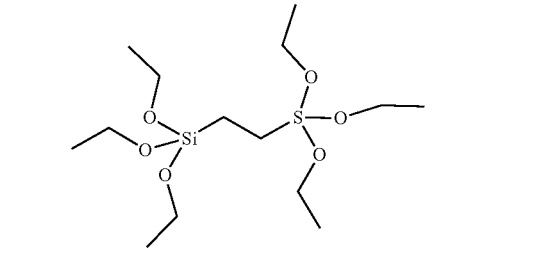

Bis-SilaneEthane

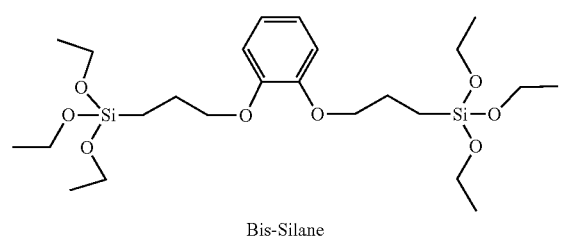

Bis-Silane

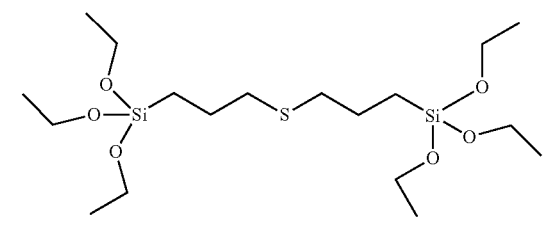

Bis-Silane ThioHexane

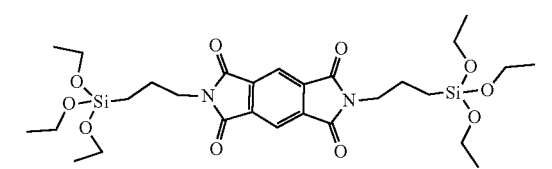

Bis-Silane

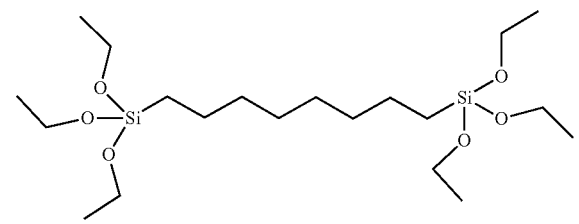

Bis-SilaneOctane

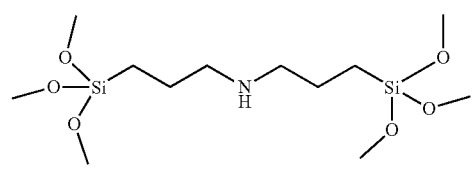

Bis-SilaneHexyAmine(Me)

-continued

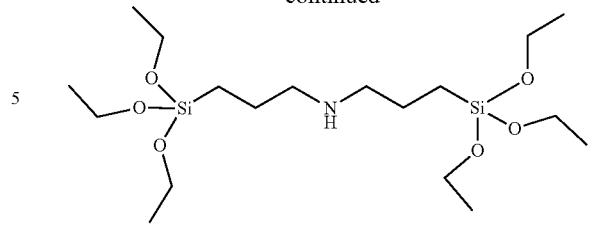

Bis-SilaneHexyAmine (Et)

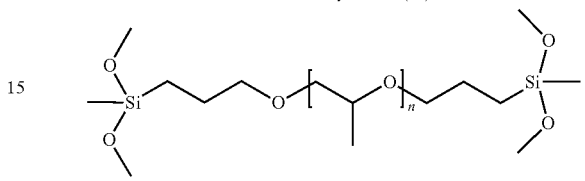

PropylPolypropylene-BisSilane (Me)

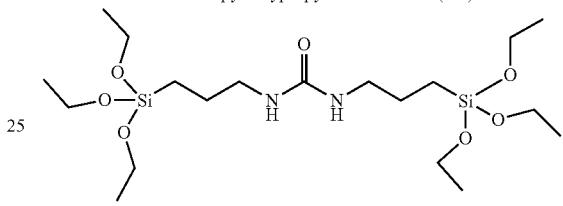

Urea-Bis-Silane

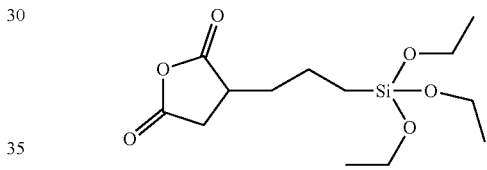

(3-triethoxysilyl)propylsuccinic anhydride

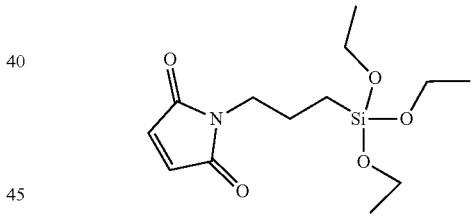

Maleimide-Silane

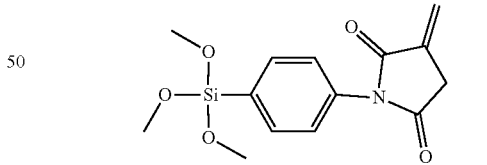

ItaconicPhenylSilane

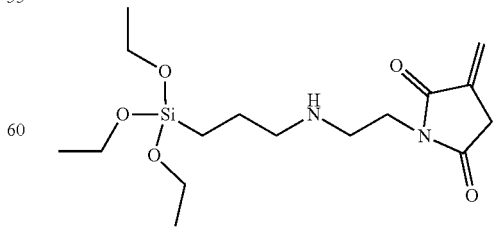

ItaconicAminoSilane

In one example embodiment, the curing agent is bis(triethoxysilyl)octane $((EtO)_3Si—(CH_2)_8Si(OEt)_3$.

In one embodiment the coupling agent is a monofunctional organosilane having the general formulae Q-A. The A represents a moiety capable of bonding to both a silica and a diene elastomer. This means that it has two active leaving groups. In one embodiment, the leaving groups can be the same or different alkoxy, cycloalkoxy, and phenoxy groups. Q represents a hydrocarbon chain, a heteroatom-containing (O, N, P) hydrocarbon, or a ring group. Like R, discussed supra in connection with the bifunctional organosilane embodiment, Q is preferably a hydrocarbon having from one to 10 carbon atoms. The hydrocarbon chain, however, could be longer and could be branched.

Non-limiting examples of monofunctional silanes of these formulae are:

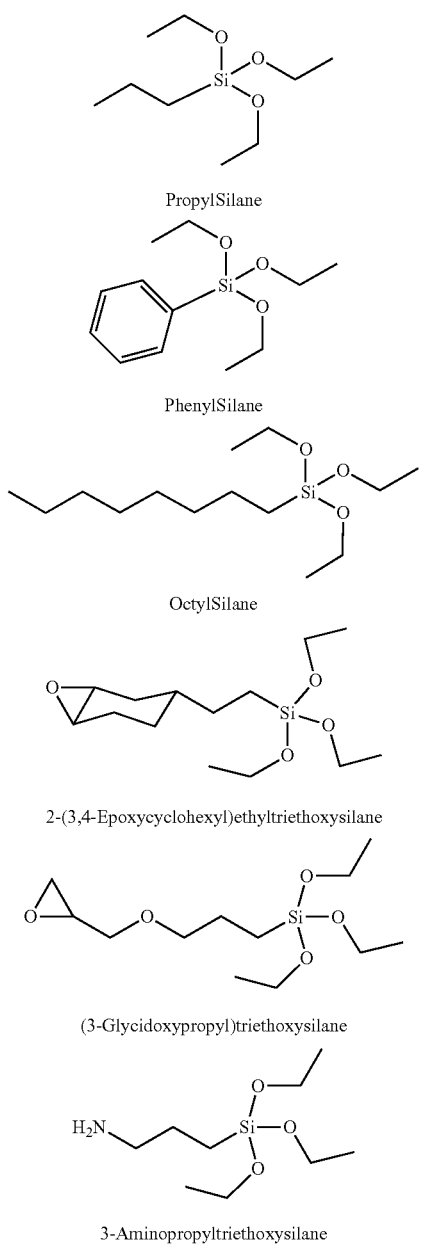

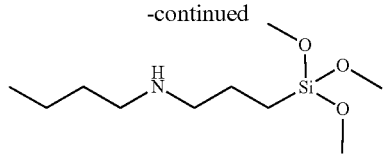

Butylaminopropyltrimethoxysilane

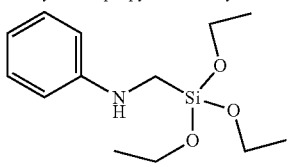

N-Phenylaminomethyltriethoxysilane

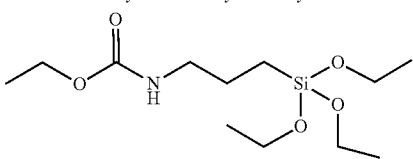

Triethoxysilylpropylethylcarbamate

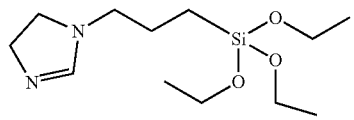

N-(3-triethoxysilylpropyl)-4,5-dihydroimidazole

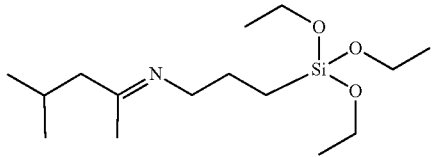

3-(1,3-dimethylbutylidene)aminopropyltriethoxysioane

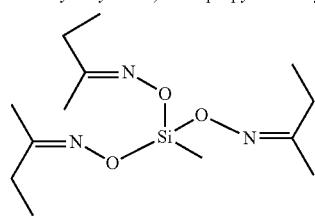

Methyltris(methylethylketoximno)silane

In one example embodiment, a monofunctional organosilane curing agent is n-octyltriethoxysilane $(EtO)_3Si—C_8H_7$.

In one embodiment, the rubber composition may include from about 1 to about 10 phr of coupling agent and, more preferably, from about 4 to about 7 phr of the silane coupling agent. In further embodiments, an additional coupling agent(s) can be employed in the rubber compound.

For both the monofunctional and bifunctional organosilane embodiments, the first leaving group provides a bond with the reinforcing filler through a silicon atom. This can be achieved through a silanization reaction. The second leaving group provides a bond with the silane functionalized elastomer through a silicon atom. This can be achieved through a siloxyl condensation reaction between the diene elastomer and the coupling agent.

One aspect of the present disclosure is that it eliminates the conventional silane-polymer coupling reaction shown in FIG. 1B for rubber compounds. Instead, by employing the disclosed coupling agent, a rubber compound is the product of the siloxyl condensation reaction between the diene elastomer and a non-sulfur containing silane coupling agent.

In one embodiment, a sulfur-vulcanizable rubber compound comprises at least one diene elastomer, a reinforcing filler including silica; and the silane coupling agent disclosed herein.

Various conjugated diene-based elastomers may be used for the rubber compound such as, for example, polymers and copolymers of at least one of isoprene and 1,3-butadiene and of styrene copolymerized with at least one of isoprene and 1,3-butadiene, and mixtures thereof.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers.

The cis 1,4-polyisoprene and cis 1,4-polyisoprene natural rubber are well known to those having skill in the rubber art.

Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile, which polymerize with butadiene to form NBR, methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether.

Specific examples of synthetic rubbers include neoprene (polychloroprene), polybutadiene (including cis-1,4-polybutadiene), polyisoprene (including cis-1,4polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers.

In practice, the preferred rubber elastomer is a is butadiene styrene or a butadiene-styrene-isoprene copolymer. In one embodiment, a second rubber can comprise natural rubber, polyisoprene or polybutadiene. In one embodiment, the second rubber can comprise a nonfunctionalized rubber.

In one embodiment, one elastomer is an SBR and, more preferably, a solution-polymerized SBR (SSBR). The SSBR can be conveniently prepared, for example, by organo lithium catalyzation in the presence of an organic hydrocarbon solvent.

In the contemplated embodiment, at least one elastomer is functionalized to react with a silica filler. Representative of functionalized elastomers are, for example, styrene/butadiene elastomers containing one or more functional groups comprised of:

(A) amine functional group reactive with hydroxyl groups on precipitated silica,
(B) siloxy functional group, including end chain siloxy groups, reactive with hydroxyl groups on precipitated silica,
(C) combination of amine and siloxy functional groups reactive with hydroxyl groups on said precipitated silica,
(D) combination of thiol and siloxy (e.g., ethoxysilane) functional groups reactive with hydroxyl groups on the precipitated silica,
(E) combination of imine and siloxy functional groups reactive with hydroxyl groups on the precipitated silica,
(F) hydroxyl functional groups reactive with the precipitated silica.

For the functionalized elastomers, representatives of amine functionalized SBR elastomers are, for example, in-chain functionalized SBR elastomers mentioned in U.S. Pat. No. 6,936,669, the disclosure of which is incorporated herein in its entirety.

Representative of a combination of amino-siloxy functionalized SBR elastomers with one or more amino-siloxy groups connected to the elastomer is, for example, HIPR355™ from JSR and amino-siloxy functionalized SBR elastomers mentioned in U.S. Pat. No. 7,981,966, the disclosure of which is incorporated herein in its entirety.

Representative styrene/butadiene elastomers end functionalized with a silane-sulfide group are, for example, mentioned in U.S. Pat. Nos. 8,217,103 and 8,569,409, the disclosures of which are incorporated herein in their entirety.

In the contemplated embodiment, at least one diene elastomer is a silane functionalized elastomer characterized by a terminal functional group comprising a single silanol functional group or a polysiloxane block which has a single silanol end.

Organic solvent polymerization prepared tin coupled elastomers may also be used, such as, for example, tin coupled organic solution polymerization prepared styrene/butadiene copolymers, isoprene/butadiene copolymers, styrene/isoprene copolymers, polybutadiene and styrene/isoprene/butadiene terpolymers including the aforesaid functionalized styrene/butadiene elastomers.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well known to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example and not intended to be limiting, in U.S. Pat. No. 5,064,901, the disclosure of which is incorporated herein in its entirety.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

It is further contemplated that, in certain embodiments, the rubber compound can include as an additional elastomer a butyl type rubber, particularly copolymers of isobutylene with a minor content of diene hydrocarbon(s), such as, for example, isoprene and halogenated butyl rubber.

Non-limiting examples of functionalized elastomers that can be used in the disclosed rubber compound can include:

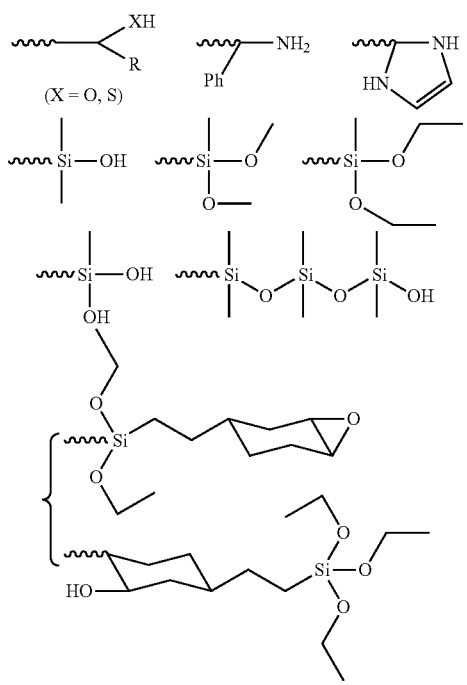

In one embodiment, the rubber composition may comprise from 0 to about 100 phr of a first rubber elastomer and, more preferably, from about 10 to about 90 phr of the first elastomer in a composition comprising at least two elastomers. In one embodiment, an additional diene-based elastomer is employed such that the composition comprises the combination of at least two elastomers (synthetic and/or natural). For example, the additional conjugated diene-based elastomer may also be present in the rubber composition in the amount of from about 1 to about 100 phr and, more specifically, from about 10 to about 90 phr. In one embodiment, at least a third rubber elastomer may be employed. In one embodiment, the first and optional second and additional elastomers, are provided in amounts that total 100 phr.

Another key ingredient to the disclosed rubber compound is a reinforcement filler comprising silica. The rubber compound may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

A silica coated carbon black and/or commonly employed carbon blacks can also be used as filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

The rubber composition may optionally include rubber processing oil. The rubber composition can include from 0 to about 100 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. In one embodiment, the rubber composition includes a low PCA oil. Suitable low PCA oils include but are not limited to mild extraction solvates (MES), treated distillate aromatic extracts (TDAE), residual aromatic extract (RAE), SRAE, and heavy napthenic oils as are known in the art; see, for example, U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917, the disclosures of which are hereby incorporated by reference.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 *Parts,* 2003, 62nd edition, published by the Institute of Petroleum, United Kingdom.

Suitable TDAE oils are available as Tudalen® SX500 from Klaus Dahleke K G, VivaTec® 400 and VivaTec® 500 from H&R Group, and Enerthene® 1849 from BP, and Extensoil® 1996 from Repsol. The oils may be available as the oil alone or along with an elastomer in the form of an extended elastomer.

Suitable vegetable oils include, for example, soybean oil, sunflower oil, rapeseed oil, and canola oil which are in the form of esters containing a certain degree of unsaturation.

It is readily understood by those having skill in the art that the rubber composition of the tread rubber would be compounded by methods generally known in the rubber compounding art, such as mixing the various sulfur-vulcanizable constituent rubbers with variously commonly used additive materials such as, for example, curing aids, such as sulfur activators, retarders and accelerators, processing additives such as oils, resins including tackifying, traction, and thermoplastic resins and plasticizers, fillers, pigments, fatty acid, zinc acid, waxes, antioxidants and antiozonants (anti-degradants), peptizing agents and reinforcing materials. As known to those skilled in the art, depending on the intended use of the sulfur vulcanizable and sulfur vulcanized material (rubbers), the additives mentioned above are selected and commonly used in conventional amounts.

Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of resins can be added in a range of from about 0 to about 100 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. A typical peptizer may be, for example, dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

Other curatives may be used, including but not limited to from 0.5 to 5 phr of 1,6-bis(N,N' dibenzylthiocarbamoyldithio)-hexane available as Vulcuren from Lanxess.

The presence and relative amounts of the above additives are not considered to be an aspect of the present invention unless otherwise indicated, which is more primarily directed to a rubber compound made using a non-sulfur containing silane coupling agent. The rubber compound may be incorporated in a variety of rubber articles, including, for example, tire components, rubber belts, and hoses, among others.

Representative of such tire component is, for example, a tire tread such including at least one of tread cap and/or tread base rubber layer tire sidewall, tire carcass component, such as, for example, a carcass cord ply coat, tire sidewall stiffening insert, an apex adjacent to or spaced apart from a tire bead, wire coat, inner liner tire chafer and/or tire bead component. The tread and/or tires can be built, shaped, molded and cured by various methods which will be readily apparent to those skilled in the art.

A pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias. In one embodiment, the tire component is intended to be ground-contacting. In another embodiment, the tire component is not ground contacting. In other embodiments, the rubber compound can be incorporated in a non-pneumatic tire.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

After mixing, the compounded rubber can be fabricated such as, for example, by extrusion through a suitable die to form a tire tread (including tread cap and tread base). The tire tread is typically built onto a sulfur curable tire carcass and the assembly thereof cured in a suitable mold under conditions of elevated temperature and pressure by methods well-known to those having skill in the art.

One aspect of the present disclosure, and particularly the silica-silane-polymer crosslinking achieved through the siloxyl reaction, is that it allows for a greater number of combinations of elastomer and coupling agents to be employed in rubber compounds. This further provides for a limitless number of rubber compounds to be formed which can It is also discovered that, by eliminating the active sulfur moiety in silane coupling agents, processability of a cured rubber compound is improved.

Example 1

In this example, the effect of the disclosed non-sulfur bis-functional silanes on the performance of a rubber compound is illustrated. Rubber compositions were mixed in a multi-step mixing procedure following the recipes in Table 1. Standard amounts of curatives and curing techniques were also used. The rubber compounds were then cured and tested for various properties including, inter alia, processing, wet traction, and rolling resistance, etc.

Control rubber compounds Samples A and B used a nonfunctionalized SBR and conventional sulfur-containing silane coupling agents. Control samples C and D used the nonfunctionalized SBR, but replaced the conventional sulfur-containing silane coupling agents with a non-sulfur containing silane coupling agent. Experimental samples E and F used a functionalized SBR and conventional sulfur-containing silane coupling agents. Experimental samples G and H used the functionalized SBR and non-sulfur containing silane coupling agents.

The basic formulations are illustrated in the following Table 1, which is presented in parts per 100 parts by weight of elastomer (phr).

TABLE 1

| | Samples | | | | | | | |
| --- | --- | --- | --- | --- | --- | --- | --- | --- |
| | Control | | | | Experimental | | | |
| | A | B | C | D | E | F | G | H |
| Non-Productive Stages | | | | | | | | |
| SSBR[1] | 0 | 0 | 0 | 0 | 70 | 70 | 70 | 70 |
| SSBR[2] | 70 | 70 | 70 | 70 | 0 | 0 | 0 | 0 |
| Polybutadiene[3] | 30 | 30 | 30 | 30 | 30 | 30 | 30 | 30 |
| Carbon black | 4.16 | 4.16 | 4.16 | 4.16 | 4.16 | 4.16 | 4.16 | 4.16 |
| Microcrystalline wax | 1 | 1 | 1 | 1 | 1 | 1 | 1 | 1 |
| Paraffin wax | 0.5 | 0.5 | 0.5 | 0.5 | 0.5 | 0.5 | 0.5 | 0.5 |
| 6-PPD | 2 | 2 | 2 | 2 | 2 | 2 | 2 | 2 |
| Processing oil (naphthenic) | 20 | 20 | 20 | 20 | 20 | 20 | 20 | 20 |
| Zinc oxide | 1.75 | 1.75 | 1.75 | 1.75 | 1.75 | 1.75 | 1.75 | 1.75 |
| Fatty acid | 2 | 2 | 2 | 2 | 2 | 2 | 2 | 2 |
| Silica | 65 | 65 | 65 | 65 | 65 | 65 | 65 | 65 |
| Coupling agent A[4] | 6 | 0 | 0 | 0 | 6 | 0 | 0 | 0 |
| Coupling agent B[5] | 0 | 5.2 | 0 | 0 | 0 | 5.2 | 0 | 0 |
| Coupling agent C[6] | 0 | 0 | 5.4 | | 0 | 0 | 5.4 | 0 |
| Coupling agent D[7] | 0 | 0 | 0 | 4.3 | 0 | 0 | 0 | 4.3 |
| Productive State | | | | | | | | |
| Antiozonant | 0.75 | 0.75 | 0.75 | 0.75 | 0.75 | 0.75 | 0.75 | 0.75 |
| Sulfur | 1.36 | 1.36 | 1.36 | 1.06 | 1.36 | 1.06 | 1.36 | 1.36 |
| Accelerator A[8] | 1.4 | 1.4 | 1.4 | 1.4 | 1.4 | 1.4 | 1.4 | 1.4 |
| Accelerator B[9] | 2 | 2 | 2 | 2 | 2 | 2 | 2 | 2 |

[1]SSBR, 21% Styrene, functionalized
[2]SSBR, non-functionalized
[3]Polybutadiene, Ni, Branche
[4]S-(Octanoyl)mercaptopropyltriethoxysilane
[5]Bis[(triethoxysilyl)propyl]tetrasulfide
[6]n-Octyltriethoxysilane
[7]Bis(triethoxysilyl)octane
[8]CBS
[9]DPG The results in Table 2 compare the cured properties of Control Samples A-F and Experimental Samples G and H.

TABLE 2

|  | Samples | | | | | | | |
| --- | --- | --- | --- | --- | --- | --- | --- | --- |
|  | Control | | | | Experimental | | | |
|  | A | B | C | D | E | F | G | H |
| Curing Conditions | | | | 10 min @ 170° C. | | | | |
| Processing | | | | | | | | |
| RPA G' 0.83 Hz, 100° C., 15% | 0.087 | 0.126 | 0.053 | 0.070 | 0.211 | 0.240 | 0.195 | 0.217 |
| R&H | | | | | | | | |
| RPA G' 1% | 1.682 | 1.811 | 1.286 | 2.462 | 1.402 | 1.846 | 1.150 | 1.809 |
| RPA G' 10% | 1.277 | 1.332 | 0.828 | 1.184 | 1.177 | 1.404 | 0.933 | 1.227 |
| RPA G' 50% | 0.855 | 0.887 | 0.555 | 0.665 | 0.927 | 1.010 | 0.742 | 0.840 |
| ARES G' 1% (60° C.), E+06 | 2.086 | 1.747 | 2.029 | 2.730 | 1.770 | 1.850 | 1.928 | 1.55 |
| ARES G' 1% (60° C.), E+06 | 1.401 | 1.313 | 1.093 | 1.304 | 1.203 | 1.328 | 1.260 | 1.208 |
| Wet Indicator | | | | | | | | |
| Rebound 0° C. | 24.64 | 25.34 | 19.53 | 19.66 | 23.02 | 23.15 | 19.66 | 24.99 |
| Rolling Resistance | | | | | | | | |
| Rebound 23° C. | 24.64 | 25.34 | 34.90 | 31.62 | 23.02 | 23.15 | 19.66 | 24.99 |
| Rebound 60° C. | 56.48 | 58.28 | 45.54 | 43.53 | 63.28 | 62.41 | 57.71 | 63.77 |
| Rebound 100° C. | 60.48 | 62.02 | 49.01 | 48.56 | 69.40 | 68.20 | 63.48 | 70.00 |
| RPA TD 10% | 0.097 | 0.100 | 0.147 | 0.171 | 0.069 | 0.081 | 0.080 | 0.101 |
| ARES TD 10%, 60° C. | 0.154 | 0.150 | 0.198 | 0.224 | 0.137 | 0.137 | 0.140 | 0.114 |
| C&F | | | | | | | | |
| Strebler to itself 100° C. | 12.23 | 10.19 | 15.97 | 17.46 | 12.31 | 9.87 | 13.58 | 9.83 |
| 100% Modulus (23° C.) | 1.98 | 2.11 | 0.82 | 1.03 | 1.71 | 2.08 | 1.47 | 1.81 |
| 300% Modulus (23° C.) | 8.30 | 9.41 | 2.06 | 2.74 | 8.14 | 10.90 | 6.42 | 9.53 |
| Tensile (23° C.) | 16.69 | 16.36 | 9.56 | 11.59 | 14.94 | 16.44 | 15.28 | 17.38 |
| Elongation (23° C.) | 495 | 446 | 741 | 737 | 447 | 398 | 512 | 443 |
| True Tensile | | | | | | | | |
| Elongation-Aged (RT Ring) | 99.36 | 89.29 | 80.43 | 96.94 | 81.72 | 81.80 | 93.49 | 94.36 |
| Grosch Abrasion-HS (lower is better) | 183 | 213 | 100 | 123 | 213 | 267 | 198 | 244 |
| C&G | | | | | | | | |
| Mod Ratio M300/M 100% | 4.20 | 4.46 | 2.50 | 2.67 | 4.76 | 5.25 | 4.36 | 5.27 |
| TW | 13.35 | 14.91 | 9.67 | 13.21 | 12.63 | 14.54 | 9.35 | 12.36 |
| Delta Torque MDR 170° C. | 1.51 | 1.84 | 2.44 | 2.27 | 1.89 | 2.03 | 3.04 | 2.53 |
| T25 MDR 170° C. | | | | | | | | |
| T90 MDR 170° C. | 4.73 | 7.42 | 4.42 | 4.09 | 5.81 | 6.94 | 5.67 | 4.54 |

The results show that the maximum torque at peak stress (measured using a Rheometer for 60 min at 170°) is lowest for Experimental Sample G, thus indicating that the Experimental Sample G displays the best processing/curing conditions. Indeed, Sample G demonstrates similar processing to, and slightly improves on, Control C. Furthermore, the torque values (indicative of processing) of Experimental Samples G and H are both lower than Controls A and B and Samples E and F—each of which used the conventional sulfur-containing silane coupling agent. It is concluded that the disclosed non-sulfur (or non-active sulfur) containing silane coupling agent, and a rubber compound containing the same with a functionalized polymer, improve processability over conventional compounds.

Figure 3:
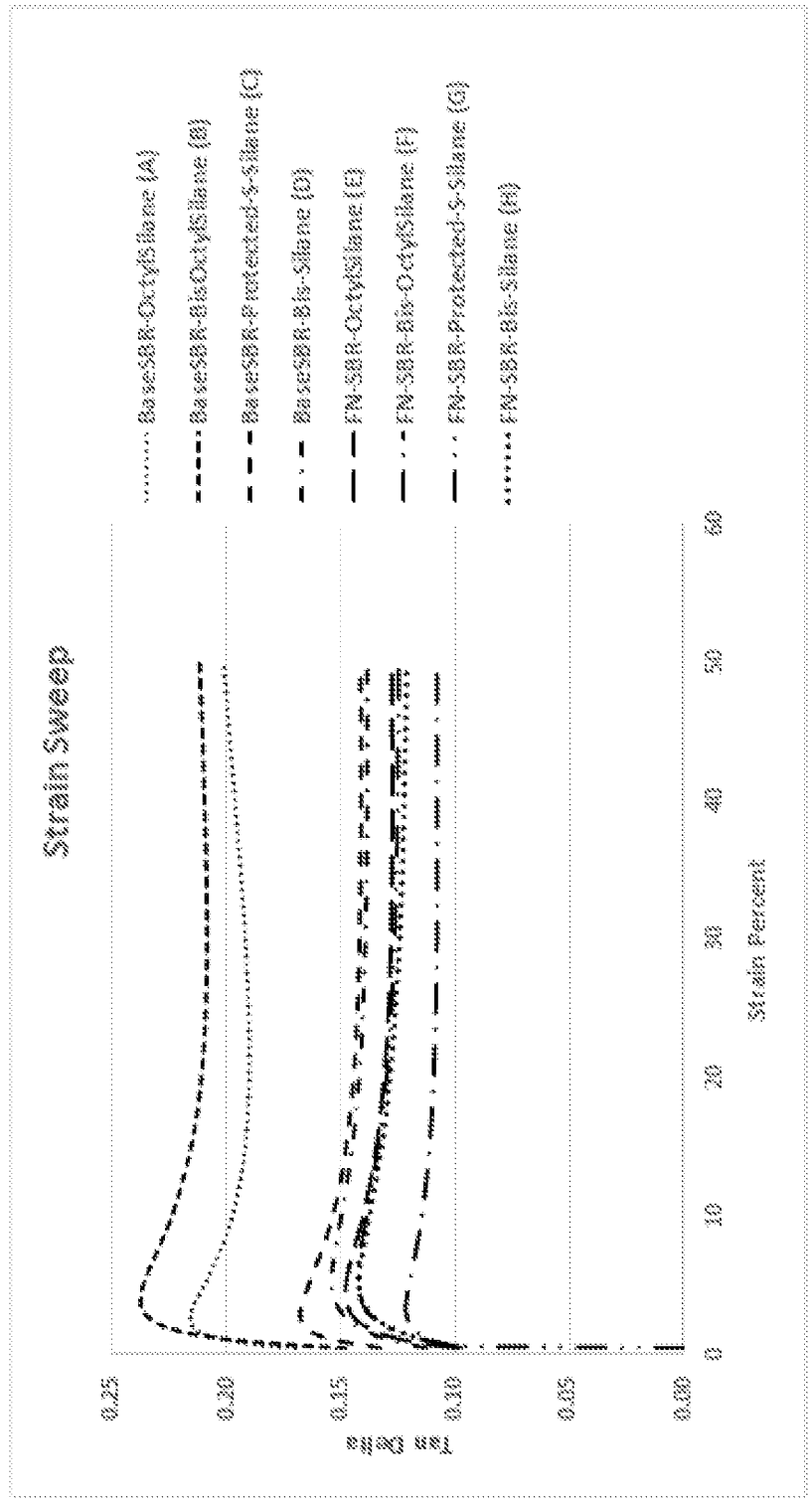
FIG. 3 shows a plot of relative Tan Delta values versus Strain (percent) for the individual Control and Experimental rubber Samples for the second series (Samples A-H) of experiments.

In FIG. 3, the tan delta values of Samples A-H are shown at the measured strain levels. Tan delta values are an indicator of hysteresis of the rubber compounds and are predictive of the effect of the rubber compounds on tire rolling resistance. Lower tan delta values at 10% strain correspond with lower predictive hysteresis, which in turn corresponds with a beneficially lower tire rolling resistance.

In FIG. 3, it can be seen that Experimental Sample G has a tan delta that is lower than the other samples. This is indicative of a beneficial reduction in rolling resistance for a vehicle tire having a tread of such rubber compound formed from a silane functionalized elastomer and a silane coupling agent absent an active sulfur moiety. A beneficial reduction in fuel consumption is also associated with vehicles employing tires of such compound. In FIG. 3, it can also be seen that the Experimental Sample H has a tan delta value that is about the same as Control Sample D, and that the Experimental Samples G and H show significantly less stress strain over Control Samples A and B.

This means that the rolling resistance for a vehicle tire having a tread of the disclosed rubber compound (formed from a silane functionalized SBR and a coupling agent without an active sulfur moiety) is significantly improved (if not roughly the same) as that for a vehicle tire having a tread of the conventional rubber compound (formed from a base SBR and coupling agent with a sulfur moiety).

Figure 4:
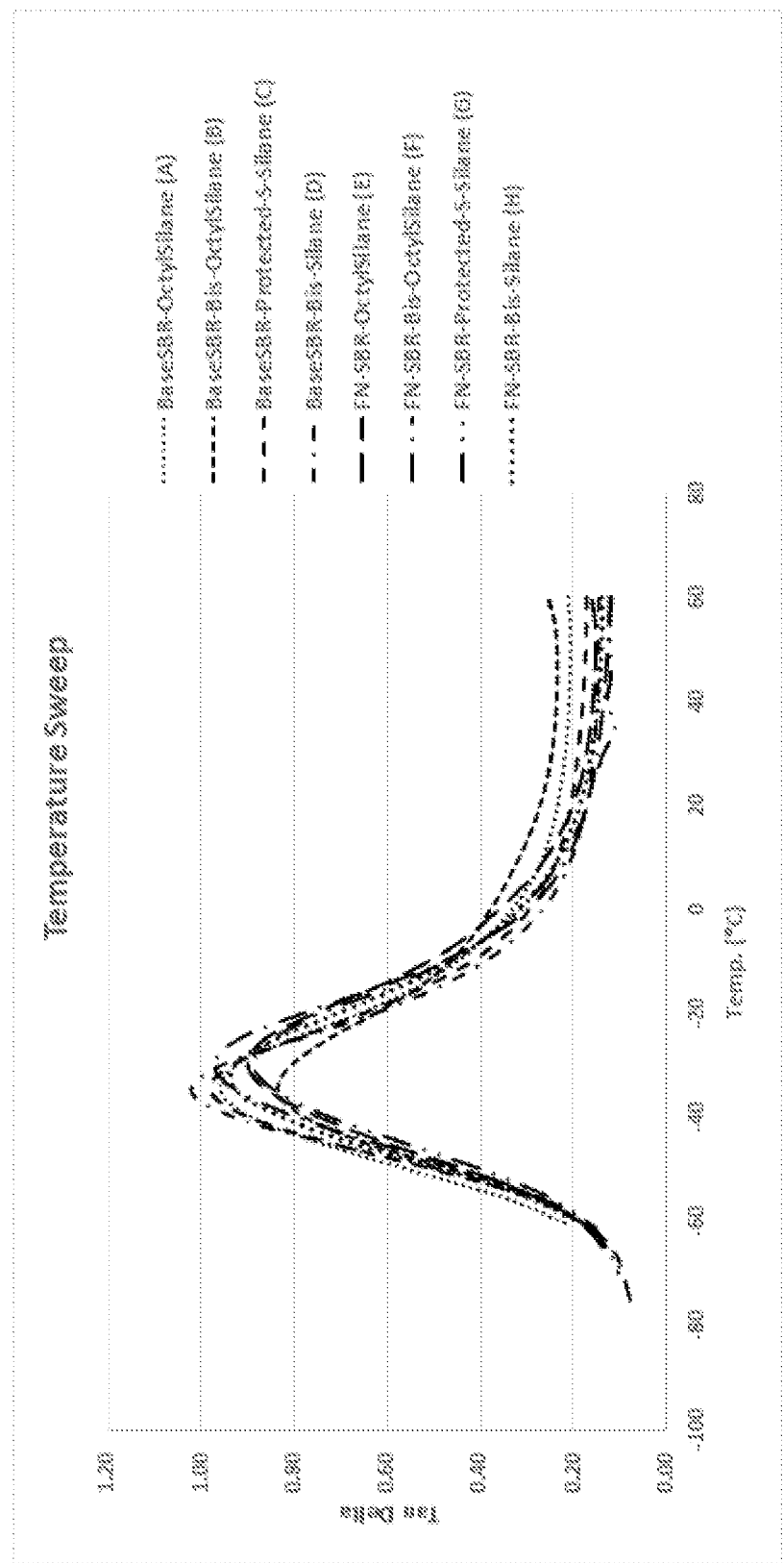
FIG. 4 shows a plot of relative Tan Delta values versus Temperature (° C.) for the individual Control and Experimental rubber Samples for the second series (Samples A-H) of experiments.

Furthermore, the viscoelastic properties of the rubber compounds are characterized in FIG. 4 using a temperature sweep plot of tangent delta values versus temperature. It can be seen that the Samples A-H display a single tan delta peak in the region from −40° C. to −20° C.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A sulfur-vulcanizable rubber compound, comprising:
   at least one diene elastomer;
   a reinforcing filler comprising silica; and
   a silane coupling agent;
   wherein the diene elastomer is a silane functionalized elastomer; and
   wherein the silane coupling agent excludes an active sulfur moiety; wherein the rubber compound is a reaction product of a silanization reaction between the silica and the coupling agent and a siloxyl condensation reaction between the silane functionalized elastomer and the coupling agent.

2. The rubber compound of claim 1, wherein the coupling agent has the general formulae A-R-A', wherein each A and A' independently represents a moiety capable of bonding to both the silica and the diene elastomer, and R is optionally a hydrocarbon chain.

3. The rubber compound of claim 2, wherein the hydrocarbon chain or a heteroatom (O, N, P)-containing hydrocarbon, the hydrocarbon having between 1 and 10 carbons.

4. The rubber compound of claim 1, wherein the coupling agent is a mono- and/or bifunctional organosilane having at least two leaving groups on a silicon atom.

5. The rubber compound of claim 4, wherein each of the leaving groups are independently selected from a group consisting alkoxy, cycloalkoxy, and phenoxy groups.

6. The rubber compound of claim 4, wherein a first of the leaving groups provides a bond with the reinforcement filler through a silicon atom and a second of the leaving groups provides a bond with the functionalized elastomer.

7. The rubber compound of claim 1, wherein the coupling agent is a bifunctional organosilane having the general formula Q-A;

wherein the A group represents a moiety capable of bonding to both the silicon and the diene elastomer; and
wherein Q is optionally a hydrocarbon chain or a heteroatom (O, N, P)-containing hydrocarbon.

8. The rubber compound of claim 7, wherein the moiety comprises at least two leaving groups on a silicon atom, each leaving group being independently selected from a group consisting alkoxy, cycloalkoxy, and phenoxy groups.

9. The rubber compound of claim 7, wherein the moiety comprises:
   a first leaving group providing a bond with the reinforcing filler through a silicon atom; and
   a second leaving group providing a bond with the functionalized elastomer through a silicon atom.

10. The rubber compound of claim 1, wherein the silane coupling agent is n-octyltriethoxysilane $(EtO)_3Si—C_8H_7$.

11. The rubber compound of claim 1, wherein the silane coupling agent is bis(triethoxysilyl)octane $((EtO)_3Si—(CH_2)_8Si(OEt)_3$.

12. The rubber compound of claim 1, wherein the functionalized diene elastomer is characterized by a terminal functional group comprising a single silanol functional group or a polysiloxane block which has a single silanol end.

13. The rubber compound of claim 1, wherein the functionalized diene elastomer is a butadiene styrene or a butadiene-styrene-isoprene copolymer.

14. The rubber compound of claim 1, wherein the rubber compound is incorporated in a tire component, rubber belt, or hose.

15. The rubber compound of claim 1, wherein the rubber composition is a functional polymer comprising a siloxane (Si—O—Si) linkage where the silica filler and the functional elastomer bond to the coupling agent.

16. A non-sulfur containing bifunctional silane coupling agent, comprising:
   at least one end terminating group reactive with a hydroxyl group contained on precipitated silica and a silane moiety contained on a diene-based elastomer.

17. The coupling agent of claim 16 further comprising:
   at least a second end terminating group selectively reactive with at least one hydroxyl group contained on precipitated silica and a silane moiety contained on a diene-based elastomer, the at least first and second end terminating groups being the same or different.

18. The coupling agent of claim 1, wherein the coupling agent is incorporated in a tire rubber compound.

19. A non-active silica-containing rubber compound for incorporation in a tire, the rubber compound comprising:
   a polymer being a reaction product of a siloxyl condensation reaction between a silane functionalized diene elastomer and a non-sulfur containing silane coupling agent.

* * * * *